United States Patent Office 2,946,002
Patented July 19, 1960

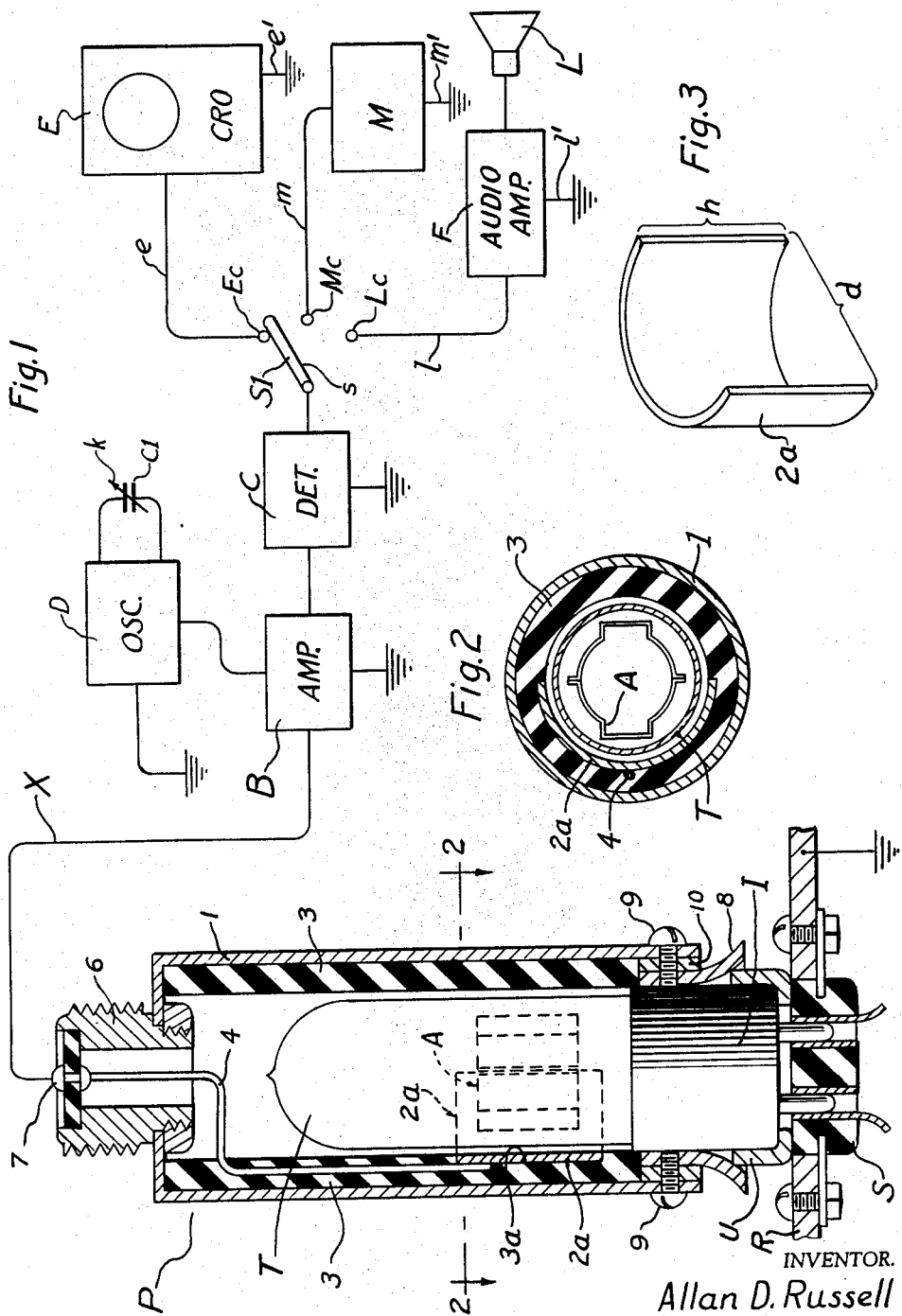

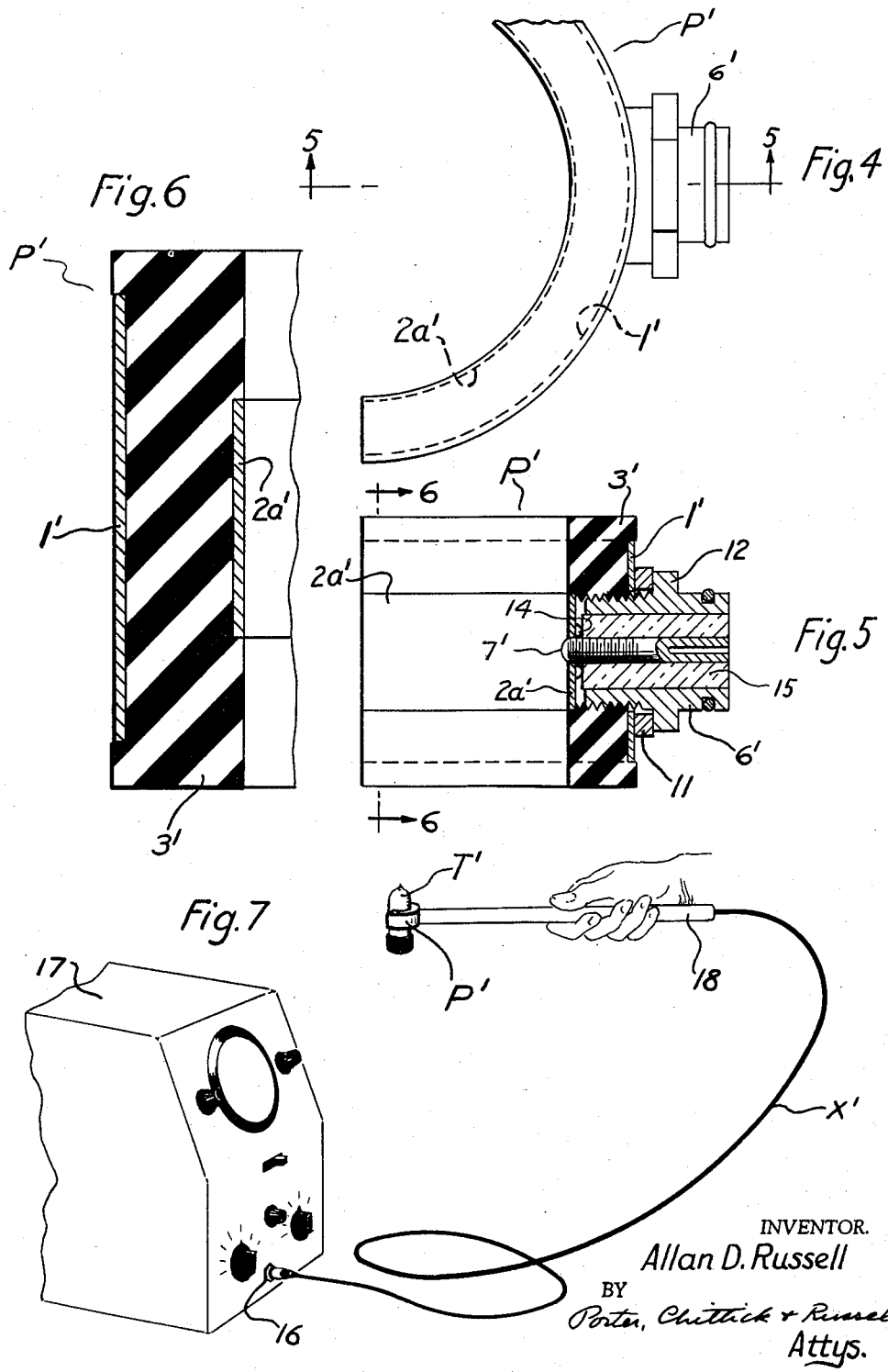

2,946,002

SIGNAL-PICKUP TEST PROBE

Allan D. Russell, Medford, Mass., assignor to Kingston Electronic Corporation, Medfield, Mass., a corporation of Massachusetts Filed Feb. 17, 1958, Ser. No. 715,607

4 Claims. (Cl. 324—24)

My invention relates to improvements in signal-pickup test probes or devices for detecting or picking up the signal carried by a component operating in an electronic circuit, more particularly a signal such as a pulse generated or shaped within a circuit, or a modulated voltage amplified or transmitted by an electron tube mounted on the chassis of a radio or television set, or the like.

In trouble-shooting electronic circuits such as those found in radio receivers, it is often advantageous to study the performance of a tube by examining the characteristics of the signal carried by the tube as the signals are indicated on the screen of an oscilloscope, by a suitable meter, or by the audible signals from a loudspeaker. Such a procedure reveals defects in circuit components which would not readily be discovered if the tube were removed and the circuit were not operating. Hitherto it has been the practice to conduct the signal from the tube by touching one of the tube pins such as those connected to the anode or cathode of the tube, with a pointed metal probe coupled to the indicator. As is well known, the tube pins or the corresponding terminals of the tube sockets are exposed and available only from underneath the chassis on which the tube is mounted, thus necessitating that the chassis be removed from its cabinet to gain access to the pins. Probing under the chassis is not only inconvenient but hazardous in view of high voltages carried by wires exposed beneath the chassis. In television and radar sets the weight of the chassis often precludes moving the chassis to permit access thereunder, and in electronic computers having many chassis and hundreds of tubes, the time involved in such removal is prohibitive.

One object of the present invention is to provide an improved signal-pickup test probe or device which will detect the signal carried by a tube or other component, or circuit part without requiring access to the underside of the chassis on which the tube or other part is mounted and without endangering the operator.

A further object is to provide an improved test probe or device of the character referred to which may be quickly applied to a number of tubes in succession, and which is simple and economical to manufacture.

Other objects and advantages will hereinafter appear.

In one aspect my improved test probe or device comprises a tubular shield of a electrical conducting material having electromagnetic shielding properties and being adapted to telescope over and to enclose the electron tube under examination. An electrically-conductive element extending circumferentially of and disposed inside the shield, preferably parallel to its inner wall, reactively picks up the signal carried by the tube, that is, inductively and/or capacitively. Dielectric material supports the aforesaid element in spaced relation to the shield, and an insulated terminal provides connection from the element to an indicating device. The pickup element may be a ring or loop of a metal conductor, or a curved or crescent-shaped plate. Preferably, the dielectric material comprises an annular sleeve fitted closely inside the shield, the sleeve and pickup element being disposed concentrically with the tubular shield.

Frequently the socket receiving the tube is provided with a grounded, cup-like receptacle for a metal sleeve adapted to shield the tube during normal operation. For such cases the pickup probe or device of the present invention is provided with a connector for grounding the shield, and this may be in the form of a flared, annular flange disposed at one end of the pickup shield for making ground connection with the cup.

This application is a continuation in part of my copending application filed February 14, 1952, and bearing Serial No. 271,499, now abandoned.

For the purpose of illustration, typical embodiments of my invention are shown in the accompanying drawings in which—

Fig. 1 is a simplified, diagrammatic view as in my copending application filed March 5, 1956, and bearing Serial No. 569,525, and shows a representative test system and the manner of application thereto or association therewith of a signal-pickup test probe embodying my invention, the latter being shown in section and on an enlarged scale;

Fig. 2 is a section taken on the line 2—2 in Fig. 1;

Fig. 3 is an isometric view of a crescent-shaped or curved signal-pickup element or plate which constitutes an important part of my improved test probe or device;

Fig. 4 is an elevational, plan view of another and preferred embodiment of my invention as claimed herein;

Fig. 5 is a section taken on the line 5—5 in Fig. 4;

Fig. 6 is an enlarged section taken on the line 6—6 in Fig. 5; and

Fig. 7 is an isometric view showing the manner of application to or connection with a cabinet containing the respective parts or components of a test system such as is shown in Fig. 1; of my improved test probe as shown in Figs. 4, 5 and 6, the manner in which the latter is applied or related to a radio tube for test purposes also being shown.

In the embodiment of my invention shown in Figs. 1, 2 and 3, the probe or device P comprises a metal electrically-conductive shield 1, a pickup element 2a in the form of a curved or crescent-shaped plate, and an insulating sleeve 3. The insulating sleeve 3 is fitted within shield 1 and has a recess 3a in which pickup element 2a is held in spaced relation to the inner wall of shield 1. At the upper end of the shield is a standard coaxial fitting 6 having an insulated terminal 7. Leading from pickup element 2a to terminal 7 is a wire 4. Preferably the sleeve 3 is formed by a number of layers of dielectric material so that the lead wire 4 may be supported between two of the layers vertically of the sleeve to a point close to the coaxial fitting 6. At the lower end of the shield an annular flange 8 is mounted on a spacer ring 10 by means of machine screws 9. The inner wall of flange 8 is flush with the insulating sleeve 3 and pickup element 2a, while the open end of flange 8 flares outwardly.

As shown in Figs. 1, 2 and 3 each drawn to the same scale, the crescent-shaped signal-pickup element or curved plate 2a embraces one hundred eighty degrees and its height $h$ as measured from Figs. 1 and 3 is substantially less than its diametrical dimension $d$ as measured from Figs. 2 and 3. Also, the opposite surfaces of element or plate 2a are cylindrical and concentric with respect to each other.

As shown in Fig. 1, the pickup device P fits over a radio tube T mounted in a convenional socket S on the chassis R of a radio receiver, television set, or the like. Extending around a portion of the insulating base I of tube T is a cup-shaped receptacle U which is clamped between base I and the chassis R to make electrical connection with the chassis. The cup U is customarily used to receive a metallic sleeve adapted to shield tube T from electromagnetic radiations in the neighborhood of chassis R.

According to the embodiment of the present invention as shown in Figs. 1, 2 and 3, the pickup plate 2a is disposed in the vicinity of the anode A of vacuum tube T when shield 1 is fitted over the tube. The pickup element 2a extends only part-way or substantially one hundred eighty degrees circumferentially of the inside of the shield 1. Element 2a is supported in such close relation to anode A that it is inductively or capacitively coupled to the anode thereby to detect the voltage variations on the anode. It is important that the spacing beween element 2a and the glass envelope of tube T be as little as possible. For this reason and as shown in Fig. 2, element 2a is curved concentrically with shield 1 and tube T. It is also important that shield 1 be grounded with respect to element 2a, for which purpose the annular flange 8 is arranged to contact cup U, thereby electrically connecting shield 1 to chassis R.

In Fig. 1 is shown the manner in which a signal detected by my improved test probe or device P may be applied to an indicator. The signal picked up by element 2a is conducted by wire 4 to terminal 7, and thence through a coaxial cable X to an amplifier B. If the tube under examination is carrying a signal at a high radio frequency or one at an intermediate frequency, it may be desirable, by means of a conventional variable capacitor C1 having the usual tuner knob $k$, or by other equivalent, tuneable elements or units, to beat the signal against an oscillating voltage supplied by a local oscillator D. The signal is thereby reduced to a frequency at which the amplifier performs with the greatest gain. The signal is thereafter rectified in a detector C and applied to a meter M, a cathode ray oscilloscope E, or through an audio amplifier F to a loudspeaker L. By the multi-contact switch S1 connected between input terminal 7 of the system and the output terminals thereof, selective connection can be made to the three indicators E, M and L. The signal may thus be applied to the indicator appropriate to the type of the signal.

The system shown in Fig. 1 makes it possible to troubleshoot or to investigate performance of a television set, for example, simply by slipping the pickup probe or device P over various tubes in the television circuits in turn and noting the response of each tube on an indicator. By this means, the many stages of the set may be investigated quickly and the cause of improper performance quickly located without removing the chassis from the set. Since the pickup probe does not make direct contact with any of the circuits, it will not appreciably affect their performance and hence will give a true indication of the operation of the circuits. In opposite contrast to prior test probes and methods wherein the difficulty involved has made it impractical to investigate electronic apparatus at its place of installation, a probe embodying the present invention affords a compact, convenient device which makes it possible to locate or to isolate troubles safely and in a fraction of the time previously involved and without necessitating that the apparatus be removed from its place of installation to a service shop.

Details of structure, arrangement and circuitry of the test system in simplified form in Fig. 1, are disclosed in my copending application filed January 12, 1953, and bearing Serial No. 330,880.

The specific probe structure just described and shown in Figs. 1, 2 and 3 is a good example of a workable embodiment of my invention. However, it is considered that my invention herein has a very broad aspect and so much so that without departing in any way from the broad or basic concept of my invention as claimed herein and while still remaining within the scope of the claims, there are possible probe structures or designs which are substantially different in shape and in overall appearance than the specific probe structure or design shown in Figs. 1, 2 and 3. An example of such a modified or different signal-pickup test probe embodying the same broad aspects of my invention as are to be found or recognized in the structure shown in Figs. 1, 2 and 3, is shown in Figs. 4, 5, 6 and 7.

In the embodiment of my invention shown in Figs. 4, 5, 6 and 7, the various parts are designated by the same reference numerals and letters designating such of those parts in Figs. 1, 2 and 3 to which they, respectively, correspond or are comparable with or are the equivalent of, such reference numerals and letters in Figs. 4, 5, 6 and 7, however, being primed. In Figs. 4 and 5 which are drawn to the same scale, the crescent-shaped signal-pickup element or curved plate 2a' also embraces one hundred eighty degrees and may be made of silver-plated brass. Also as in Figs. 1, 2 and 3, the opposite surfaces of plate 2a' are cylindrical and concentric with respect to each other. The height of plate 2a' as measured from Fig. 5 is substantially less than its diametrical dimension as measured from Fig. 4, but more so than the same relation of $h$ to $d$ for plate 2a in Figs. 1, 2 and 3. Disposed about and symmetrical with respect to plate 2a' is a crescent-shaped part 1' of electrically-shielding material which also embraces one hundred eighty degrees. Between plate 2a' and part 1' and symmetrical with respect to both is a crescent-shaped part 3' of electrically-insulating material embracing one hundred eighty degrees. Similarly to plate 2a in Figs. 1, 2 and 3 and as shown more clearly in Fig. 6, plate 2a' is set into or inlaid in the adjacent, inside cylindrical surface of the insulating part 3'. The shielding part 1' is set into or inlaid in the adjacent, outside cylindrical surface of part 3'.

A coaxial fitting 6' of a conventional design is screwed into and extends through part 3', at the center of the latter, a metal washer 11 being interposed and clamped tightly between part 1' and the hexagonal nut 12 of fitting 6'. Washer 11 provides a good electrical connection between part 1' and nut 12 which, in operation of the probe is electrically connected to the grounded, outer shield of the coaxial cable X'.

On the outside cylindrical surface of plate 2a' and centrally disposed with respect to the latter is a brass or copper eyelet 14 through which passes in interlocking fashion the head of an inner copper connector or terminal 7' insulated by ceramic material 15. In operation of the probe, the connector or insulated terminal 7' carries the signal input and is electrically connected to the inner conductor of coaxial cable X'.

In operation, the probe P' is attached to one end of coaxial cable X' by means of a suitable complementary fitting (not shown). The other end of cable X' is plugged into a jack 16 on the front panel of a cabinet 17 within which are the various components and circuitry making up the test system shown in block diagram, in Fig. 1.

A length of relatively rigid, insulating tubing 18 through which the probe end of coaxial cable X' passes, serves as a handle for convenient and safe manual manipulation of probe P'.

To test a tube T', for example, the tubing or handle 18 is grasped by the hand, as shown in Fig. 7, and the crescent-shaped probe P' is moved or manipulated to embrace the tube. Any signals picked up, such as by capacitive coupling with plate 2a', are transmitted by way of coaxial cable X' to the test apparatus in cabinet 17.

Considering probe P' as an entirety; the overall, crescent shape thereof is one form of open configuration, as is also the cup-shaped configuration in Fig. 1, whereby the probe by manual manipulation thereof can always be moved freely into and out of functional relationship with respect to a tube or other part being tested. For such relationship and as shown in Fig. 7, it is a simple and easy matter to make the probe P' embrace the tube or other part for quick testing.

The two embodiments of my invention disclosed herein, i.e., the cup-shaped probe P in Figs. 1 and 2 and the crescent-shaped probe P' in Figs. 4, 5 and 6, illustrate the relatively wide range of design possible in carrying out or in practicing the broad aspects of my invention as defined by the claims. From this it will be appreciated and understood that other modifications well within the conception of those skilled in the art are possible without departing from the spirit of my invention or the scope of the claims.

The invention claimed is:

1. For detecting a signal in an electron tube operating in an electronic circuit, a pickup device comprising an annular shield of conducting material for telescoping over and enclosing the tube, a crescent-shaped conducting element extending parallel to the inner wall of the shield inside the shield for capacitively picking up the signal carried by said electron tube, dielectric material supporting the element in spaced relation to the shield, an insulated terminal supported by the shield for connecting the element to an indicating device, and a connection supported by said dielectric material between said element and terminal.

2. For detecting a signal in an electron tube operating in an electronic circuit, a unitary pickup device comprising an annular shield of conducting material for telescoping over and surrounding the tube, a crescent-shaped conducting element extending parallel to the inner wall of the shield inside the shield for capacitively picking up the signal carried by said electron tube, dielectric material supporting the element in spaced relation to the shield, and an output conductor connected to said element and supported by said dielectric material so as to extend outside said shield and be movable with said device as the device is applied to and removed from a tube.

3. For detecting a signal in an electron tube operating in an electronic circuit, a unitary pickup device comprising an annular shield of conducting material for telescoping over and enclosing the tube, a crescent-shaped conducting element extending parallel to the inner wall of the shield inside the shield for capacitively picking up the signal carried by said electron tube, dielectric material supporting the element in spaced relation to the shield, said dielectric material having a passage therethrough, and an output conductor connected to said element and supported by said device so as to extend through said passage outside said shield.

4. For detecting a signal in an electron tube operating in an electronic circuit, a unitary pickup device comprising an annular shield of conducting material for telescoping over and enclosing the tube, a crescent-shaped conducting element extending parallel to the inner wall of the shield inside the shield for capacitively picking up the signal carried by said electron tube, dielectric material supporting the element in spaced relation to the shield, said dielectric material having a passage therethrough, and an output conductor connected to said element and supported in said passage in predetermined spaced relation to said shield.

References Cited in the file of this patent

UNITED STATES PATENTS

| | | |
|---|---|---|
| 1,523,893 | Pitard | Jan. 20, 1925 |
| 2,019,939 | Suller | Nov. 5, 1935 |
| 2,267,539 | Thorne | Dec. 23, 1941 |
| 2,307,499 | Frakes | Jan. 5, 1943 |
| 2,323,931 | Peters | July 13, 1943 |
| 2,519,407 | Shive | Aug. 22, 1950 |
| 2,613,345 | Osterland | Oct. 7, 1952 |
| 2,759,144 | Whyman | Aug. 14, 1956 |

OTHER REFERENCES

Baer: "Electronic Design," June 1, 1957, pp. 26–29.